US012771920B2

(12) United States Patent
Collins

(10) Patent No.: US 12,771,920 B2
(45) Date of Patent: Oct. 20, 2026

(54) HEADPHONES EMBODYING A WEARABLE AUDIO-VIDEO RECORDING AND TRACKING SYSTEM

(71) Applicant: Otto Edward Collins, Jonesboro, AR (US)

(72) Inventor: Otto Edward Collins, Jonesboro, AR (US)

( * ) Notice: Subject to any disclaimer, the term of this patent is extended or adjusted under 35 U.S.C. 154(b) by 412 days.

(21) Appl. No.: 18/340,189

(22) Filed: Jun. 23, 2023

(65) Prior Publication Data

US 2024/0430558 A1 Dec. 26, 2024

(51) Int. Cl.

*H04R 5/033* (2006.01)
*H04N 23/51* (2023.01)
*H04N 23/57* (2023.01)
*H04R 1/10* (2006.01)

(52) U.S. Cl.

CPC ............. *H04N 23/57* (2023.01); *H04N 23/51* (2023.01); *H04R 1/1008* (2013.01); *H04R 1/1091* (2013.01)

(58) Field of Classification Search

CPC .... H04R 1/1008; H04R 5/033; H04R 5/0335; H04R 2201/107

See application file for complete search history.

(56) References Cited

U.S. PATENT DOCUMENTS 6,918,678 B2 7/2005 McClanahan
7,209,177 B2 4/2007 Lapalme et al.
8,902,315 B2 12/2014 Fisher et al.
9,690,005 B2 6/2017 Deng
10,373,510 B2 8/2019 Nguyen
10,405,081 B2 9/2019 Hviid et al.
10,613,336 B2 * 4/2020 Urbach .................. G09G 3/001
10,652,640 B2 * 5/2020 Chase .............. H04N 21/47205
10,893,352 B2 1/2021 Hawkes et al.
11,019,261 B2 5/2021 Chase et al.
2002/0003889 A1 1/2002 Fischer
2002/0109579 A1 8/2002 Pollard et al.
2003/0025828 A1 2/2003 Ramonowski et al.
2005/0071166 A1 3/2005 Comerford et al.
2006/0287014 A1 12/2006 Matsuura et al.
2009/0262205 A1 10/2009 Smith
2010/0118158 A1 5/2010 Boland et al.
2014/0147099 A1 5/2014 Chase
2019/0204606 A1 * 7/2019 Yang .................... H04R 5/0335
2020/0252495 A1 8/2020 Hardi (Continued)

FOREIGN PATENT DOCUMENTS

CN 114554094 A * 5/2022 ........... H04N 23/651
WO WO-2018116368 A1 * 6/2018 ............. H04R 5/033

*Primary Examiner* — Ryan Robinson

(74) *Attorney, Agent, or Firm* — Dunlap Bennett & Ludwig PLLC

(57) ABSTRACT

A system of recording and tracking audio-visual data from headphones covertly track and record audio-video data while the headphones are conventionally being worn. The headphones may include a microphone for capturing audio data. A plurality of image-capturing devices may be disposed along the headband and earcups of the headphones to define a triangular arrangement that facilitates the capturing of video data of what is in front of the wearer. A tracking device may imprint geospatial location and timer-based information on all video and audio data captured by the headphones.

6 Claims, 3 Drawing Sheets

(56) References Cited

U.S. PATENT DOCUMENTS

| | | | | |
|---|---|---|---|---|
| 2021/0405751 | A1 | 12/2021 | Ross | |
| 2022/0095053 | A1 | 3/2022 | Nyimpha | |
| 2024/0179448 | A1 * | 5/2024 | Colbert ................ | H04R 1/1016 |

* cited by examiner

HEADPHONES EMBODYING A WEARABLE AUDIO-VIDEO RECORDING AND TRACKING SYSTEM

BACKGROUND OF THE INVENTION

The present invention relates to headphones and, more particularly, to headphones embodying a wearable audio-video recording and tracking system.

Headphones usually consist of a pair of earcups interconnected by an arcuate headband. The earcup is dimensioned and adapted to completely circumscribe or surround a user's ears when worn for listening to an audio source privately and with the highest possible audio quality.

However, currently headphones do not provide an audio-video recording and tracking system, as the separate functionality of such a system currently tends to be embodied in disparate handheld or wearable devices. This is disadvantageous because there is evidence, along with police advertising campaigns, warning citizens that there is an increased risk of being accosted or assaulted when wherein headphones (see, *Wearing Headphones Increases Your Risk Of Being Mugged, Say Police* By David Flett, Wales Online, 13 Mar. 2022). Thus, the current disparate devices with audio-video recording and tracking system do no good in such situations, in terms of gathering admissible evidence of a confrontation between the wearer, an assailant, as well as the police.

As can be seen, there is a need for headphones embodying a wearable audio-video recording and tracking system to covertly track and record admissible evidence while the headphones are conventionally being worn.

SUMMARY OF THE INVENTION

The present invention provides headphones embodying a wearable audio-video recording and tracking system, wherein the headphones provide a plurality of cameras, a speaker, a microphone, a tracking device, at least one light-emitting device, an external power source, a flash memory port and associable flash memory card, a charging port and associable charging cable, and an auxiliary port and associable auxiliary card.

The headphones embodied in the present invention enable handsfree recordation of audio-video data and the tracking of said audio-video data in real time for later providing as admissible evidence in a court of law. The tracking functionality also enables the headphones to be found by their owner when lost.

The video data captured by the present invention is enhanced by the novel arrangement of a plurality of cameras or image-capturing devices. The plurality of image-capturing devices includes a first image-capturing device disposed at or adjacent the apex of the arcuate headband, a second image-capturing device disposed at or adjacent each distal end of the headband, and a third and fourth image-capturing device spaced apart along an edge of each earcup.

In one aspect of the present invention, headphones data recordation and tracking system, wherein the headphones have an arcuate headband interconnecting two earcups, the system includes the following: a plurality of image-capturing devices comprising a first image-capturing device disposed at or adjacent an apex of the arcuate headband and two second image-capturing devices disposed, respectively, at or adjacent each distal end of the arcuate headband; and a tracking device operatively associated with the plurality of image-capturing devices, wherein the tracking device identifies a geospatial location of the headphones and a time for video data captured by way of the plurality of image-capturing devices.

In another aspect of the present invention, the system may further include the following: a third image-capturing device for the plurality of image-capturing devices disposed along an edge of each earcup; a fourth image-capturing device for the plurality of image-capturing devices disposed along the edge of each earcup and radially spaced apart the third image-capturing device; a microphone operatively associated with at least one earcup of the two earcups; a microphone boom interconnecting the microphone to the at least one earcup of the two earcups; a light-emitting device disposed along a lateral face of each earcup; a software application operatively associating the microphone, the tracking device, and the plurality of image-capturing devices to a cloud server; and a flash memory port.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides headphones embodying a wearable audio-video recording and tracking system to covertly track and record audio-video data while the headphones are conventionally being worn.

Figure 1:
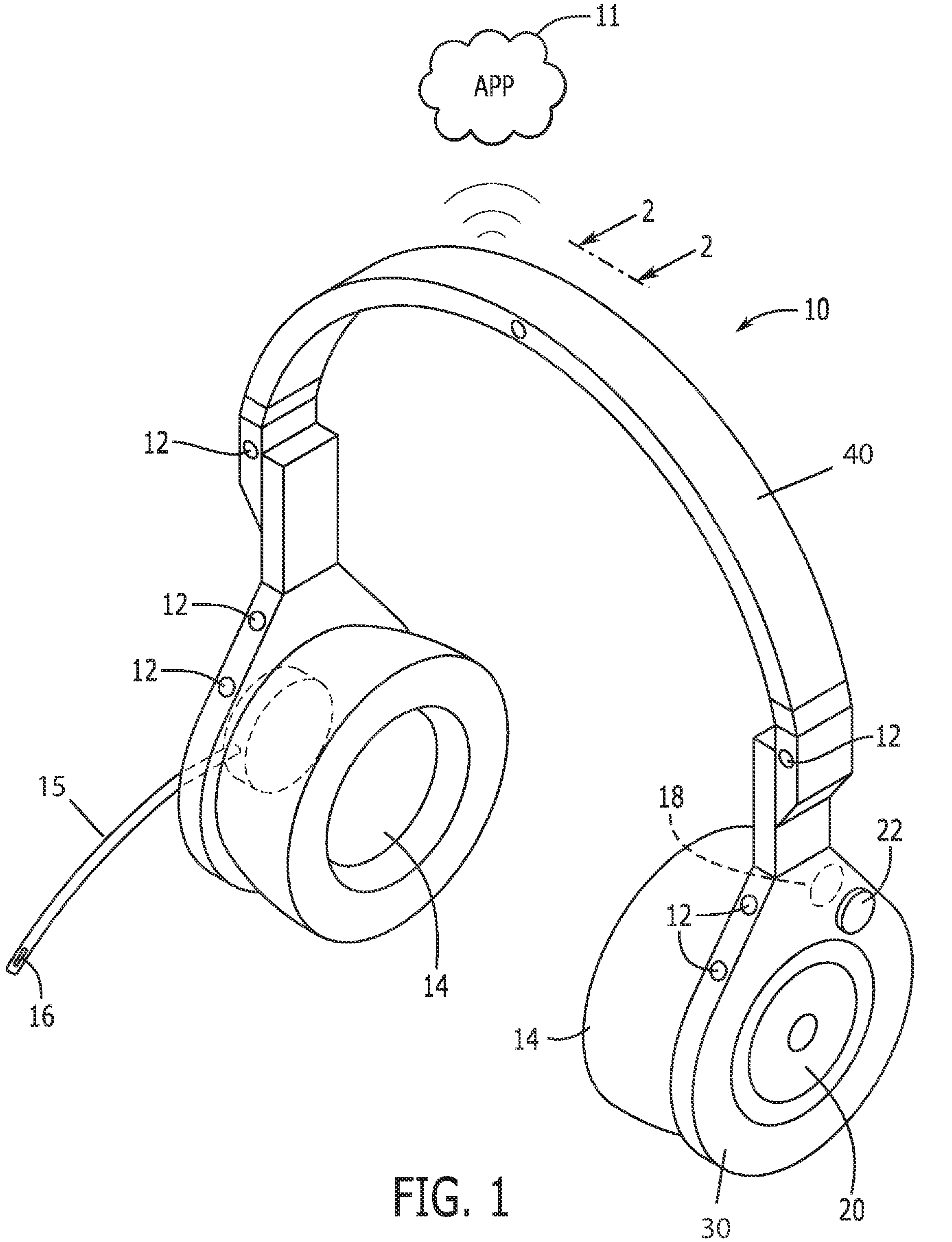
FIG. 1 a side perspective view of an exemplary embodiment of the present invention.
Figure 2:
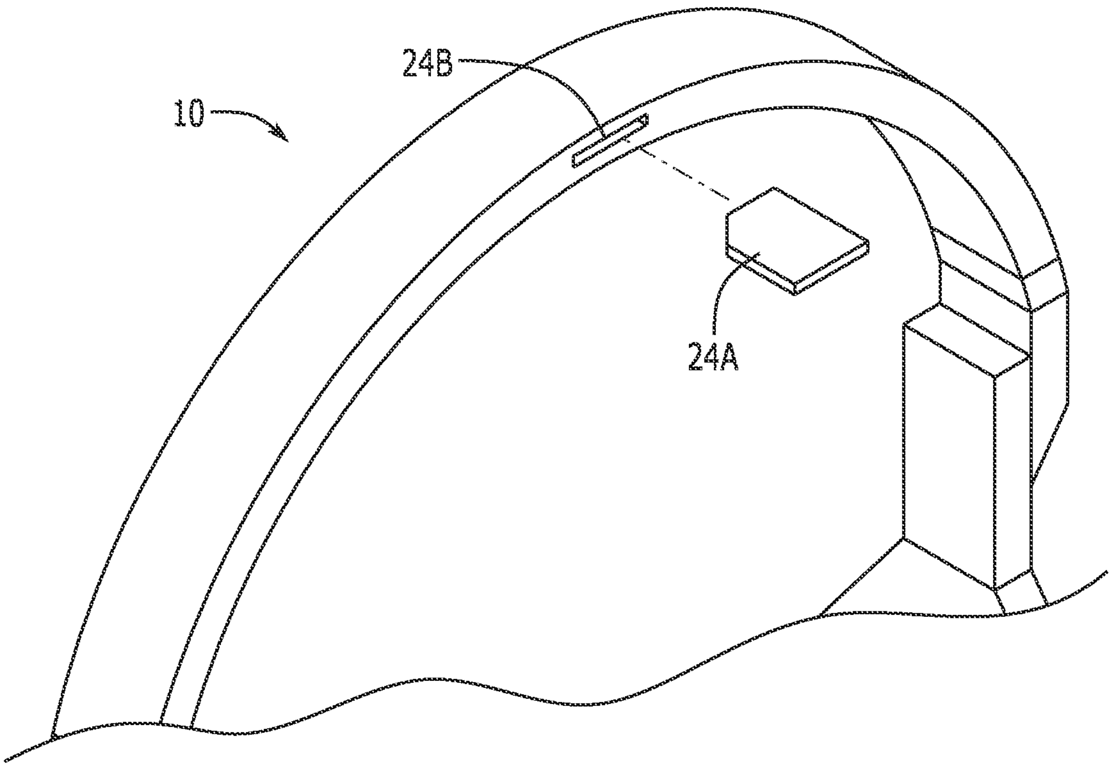
FIG. 2 is an exploded, detail side perspective view of an exemplary embodiment of the present invention, taken along line 2-2 in FIG. 1, illustrating the operative association of a non-volatile flash memory card 24A.
Figure 3:
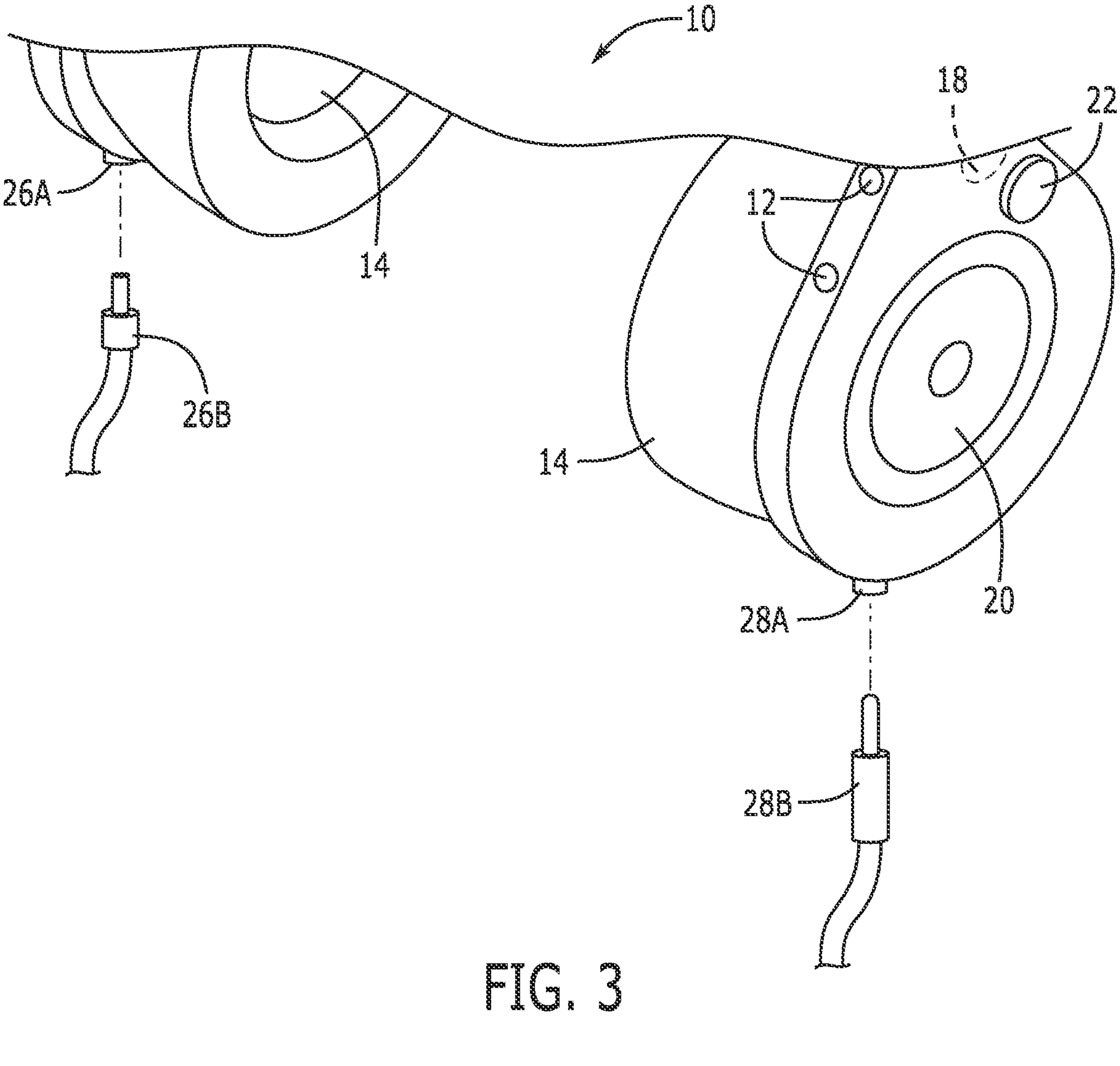
FIG. 3 is an exploded, detail side perspective view of an exemplary embodiment of the present invention, illustrating the operative association of a charging cable 26B and an auxiliary card 28B.

Referring to FIGS. 1 through 3, the present invention may include headphones 10 with a pair of earcups 30 interconnected by an arcuate headband 40. The headphones 10 enables a novel arrangement of a plurality of image-capturing devices 12. The plurality of image-capturing devices may include a first image-capturing device 12 disposed at or adjacent the apex of the arcuate headband 40, a second image-capturing device 12 disposed at or adjacent each distal end of the headband 40, and a third and fourth image-capturing device 12 spaced apart along an edge of each earcup 30.

Each earcup 30 provides a speaker 14 for outputting audio from a connected audio source. Each earcup 30 may provide a light source 20 along a lateral facing surface, opposite the speaker 14, wherein the light source 20 may be used to assist with the image capturing devices 12 (e.g., cameras).

The headphone 10 may also provide a tracking device 18 configured to capture and geospatially track where the audio and video data is being captured as well as the time the audio-visual data was captured. The tracking device 18 can identify where and when video data, as well as audio data, is captured.

At least one of the earcups 30 may provide a microphone 16, in certain embodiments at a distal end of a microphone boom 15. Microphone 16 is configured to capture audio output of the wearer as well as ambient audio data.

The tracking device 18 along with many other of the functionality components disclosed herein may be wirelessly coupled to a cloud server, online platform, other database over a network by way of software application 11, wherein the software application 11 enables retrievable storage of the audio data and video date captured by the microphone 16 and the plurality of image-capturing devices 12, respectively, along with the associated tracking data provided by the tracking device 18. The audio data captured by microphone 16 may be telecommunicated over a network (e.g., Internet) by way of the software application 11.

The headband 40 may provide a non-volatile flash memory card slot 24B for removably receiving a non-volatile flash memory card 24A. Each earcup 30 may provide one of a charging port 26A for operatively associating with a charging cable and an auxiliary port 28A for removably receiving an auxiliary input device 28B. The audio input device may enable the user to plug in audio directly. The headphones 10 may provide an external power source 22 to power all the above functionality components.

The present invention works by recording, via the arrangement of the plurality of image-capturing devices 12. The arrangement is generally triangular relative to a coronal plane of a wearer of the headphones 10, when the headband 40 is worn across the crown of the wearer's head. Thereby, the plurality of image-capturing devices 12 capture the entirety of an individual in front of the wearer of the headphones 10. Because of the triangular arrangement, and the angling of some of the image-capturing devices 12 of the plurality of the image-capturing devices 12, the video data can include a head-to-toe image of such an individual even if they are face to face with the wearer of the headphones 10. The angles and triangular arrangement of the plurality of image-capturing devices 12 enables a wide range of video capture angles. Microphone 16 captures audio output associated with the video output captured by the plurality of the image-capturing devices 12.

The non-volatile flash memory card 24 may be utilized if the cloud server (exported thereto by the software application 11) is unavailable. The software application enables 11 real-time streaming of the audio-video data captured by the headphones 10.

The light-emitting devices 20 can be selective in the amount and frequency of lumens that they output.

Accordingly, the present invention could be used for social media, legal proceedings, cooking, driving down the road, exercising in the gym, or any other environment where tracked audio-visual data would be a boon.

In certain embodiments, the network may refer to any interconnecting system capable of transmitting audio, video, signals, data, messages, or any combination of the preceding. The network may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

The server and the computer of the present invention may each include computing systems. This disclosure contemplates any suitable number of computing systems. This disclosure contemplates the computing system taking any suitable physical form. As example and not by way of limitation, the computing system may be a virtual machine (VM), an embedded computing system, a system-on-chip (SOC), a single-board computing system (SBC) (e.g., a computer-on-module (COM) or system-on-module (SOM)), a desktop computing system, a laptop or notebook computing system, a smart phone, an interactive kiosk, a mainframe, a mesh of computing systems, a server, an application server, or a combination of two or more of these. Where appropriate, the computing systems may include one or more computing systems; be unitary or distributed; span multiple locations; span multiple machines; or reside in a cloud, which may include one or more cloud components in one or more networks. Where appropriate, one or more computing systems may perform without substantial spatial or temporal limitation one or more steps of one or more methods described or illustrated herein. As an example, and not by way of limitation, one or more computing systems may perform in real time or in batch mode one or more steps of one or more methods described or illustrated herein. One or more computing systems may perform at different times or at different locations one or more steps of one or more methods described or illustrated herein, where appropriate.

In some embodiments, the computing systems may execute any suitable operating system such as IBM's zSeries/Operating System (z/OS), MS-DOS, PC-DOS, MacOS, Windows, Unix, OpenVMS, an operating system based on Linux, or any other appropriate operating system, including future operating systems. In some embodiments, the computing systems may be a web server running web server applications such as Apache, Microsoft's Internet Information Server™, and the like.

In particular embodiments, the computing systems include a processor, a memory, a user interface and a communication interface. In particular embodiments, the processor includes hardware for executing instructions, such as those making up a computer program. The memory includes main memory for storing instructions such as computer program(s) for the processor to execute, or data for processor to operate on. The memory may include mass storage for data and instructions such as the computer program. As an example and not by way of limitation, the memory may include an HDD, a floppy disk drive, flash memory, an optical disc, a magneto-optical disc, magnetic tape, a Universal Serial Bus (USB) drive, a solid-state drive (SSD), or a combination of two or more of these. The memory may include removable or non-removable (or fixed) media, where appropriate. The memory may be internal or external to computing system, where appropriate. In particular embodiments, the memory is non-volatile, solid-state memory.

The user interface may include hardware, software, or both providing one or more interfaces for communication between a person and the computer systems. As an example, and not by way of limitation, a user interface device may include a keyboard, keypad, microphone, monitor, mouse, printer, scanner, speaker, still camera, stylus, tablet, touchscreen, trackball, video camera, another suitable user interface or a combination of two or more of these. A user interface may include one or more sensors. This disclosure contemplates any suitable user interface.

The communication interface includes hardware, software, or both providing one or more interfaces for communication (e.g., packet-based communication) between the computing systems over the network. As an example, and not by way of limitation, the communication interface may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface. As an example, and not by way of limitation, the computing systems may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the computing systems may communicate with a wireless PAN (WPAN) (e.g., a BLUETOOTH WPAN), a WI-FI network, a WI-MAX network, a cellular telephone network (e.g., a Global System for Mobile Communications (GSM) network), or other suitable wireless network or a combination of two or more of these. The computing systems may include any suitable communication interface for any of these networks, where appropriate.

As used in this application, the term "about" or "approximately" refers to a range of values within plus or minus 10% of the specified number. And the term "substantially" refers to up to 80% or more of an entirety. Recitation of ranges of values herein are not intended to be limiting, referring instead individually to any and all values falling within the range, unless otherwise indicated, and each separate value within such a range is incorporated into the specification as if it were individually recited herein.

For purposes of this disclosure, the term "aligned" means parallel, substantially parallel, or forming an angle of less than 35.0 degrees. For purposes of this disclosure, the term "transverse" means perpendicular, substantially perpendicular, or forming an angle between 55.0 and 125.0 degrees. Also, for purposes of this disclosure, the term "length" means the longest dimension of an object. Also, for purposes of this disclosure, the term "width" means the dimension of an object from side to side. For the purposes of this disclosure, the term "above" generally means superjacent, substantially superjacent, or higher than another object although not directly overlying the object. Further, for purposes of this disclosure, the term "mechanical communication" generally refers to components being in direct physical contact with each other or being in indirect physical contact with each other where movement of one component affect the position of the other.

The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the disclosed embodiments.

In the following description, it is understood that terms such as "first," "second," "top," "bottom," "up," "down," and the like, are words of convenience and are not to be construed as limiting terms unless specifically stated to the contrary.

It should be understood, of course, that the foregoing relates to exemplary embodiments of the invention and that modifications may be made without departing from the spirit and scope of the invention as set forth in the following claims.

What is claimed is:

1. A headphones data recordation and tracking system, wherein the headphones have an arcuate headband interconnecting two earcups, the system comprising:

a plurality of image-capturing devices comprising a first image-capturing device disposed at or adjacent an apex of the arcuate headband and two second image-capturing devices disposed, respectively, at or adjacent each distal end of the arcuate headband; and a tracking device operatively associated with the plurality of image-capturing devices, wherein the tracking device identifies a geospatial location of the headphones and a time for video data captured by way of the plurality of image-capturing devices;

a third image-capturing device for the plurality of image-capturing devices disposed along an edge of each earcup; and a fourth image-capturing device for the plurality of image-capturing devices disposed along the edge of each earcup and radially spaced apart the third image-capturing device.

2. The system of claim 1, further comprising a microphone operatively associated with at least one earcup of the two earcups.

3. The system of claim 2, further comprising a microphone boom interconnecting the microphone to the at least one earcup of the two earcups.

4. The system of claim 3, further comprising a light-emitting device disposed along a lateral face of each earcup.

5. The system of claim 4, further comprising a software application operatively associating the microphone, the tracking device, and the plurality of image-capturing devices to a cloud server.

6. The system of claim 5, further comprising a flash memory port.

* * * * *